(12) United States Patent
Meier

(10) Patent No.: US 7,971,403 B2
(45) Date of Patent: Jul. 5, 2011

(54) PLATE-SHAPED COVER MATERIAL

(76) Inventor: Poul-Ernst Meier, Farum (DK)

( * ) Notice: Subject to any disclaimer, the term of this patent is extended or adjusted under 35 U.S.C. 154(b) by 553 days.

(21) Appl. No.: 10/380,488

(22) PCT Filed: Sep. 13, 2001

(86) PCT No.: PCT/DK01/00597
§ 371 (c)(1),
(2), (4) Date: Jul. 28, 2003

(87) PCT Pub. No.: WO02/28635
PCT Pub. Date: Apr. 11, 2002

(65) Prior Publication Data
US 2004/0025462 A1 Feb. 12, 2004

(30) Foreign Application Priority Data

Sep. 13, 2000 (DK) .................................. 2000 01359
Feb. 1, 2001 (DK) .................................. 2001 00167

(51) Int. Cl.
*E04D 13/15* (2006.01)
*E04D 5/02* (2006.01)
(52) U.S. Cl. ........... 52/411; 52/409; 52/408; 52/745.06; 52/454; 428/391
(58) Field of Classification Search .................... 52/411, 52/409, 408, 745.06, 745.19, 746.11, 746.12, 52/454, 58, 63; 428/391, 48, 44
See application file for complete search history.

(56) References Cited

U.S. PATENT DOCUMENTS

| | | | | |
|---|---|---|---|---|
| 1,677,073 A | * | 7/1928 | George | 52/451 |
| 1,976,395 A | * | 10/1934 | Herbest, Jr. | 52/452 |
| 1,982,109 A | * | 11/1934 | Keown | 404/134 |
| 1,983,412 A | * | 12/1934 | Smith | 52/670 |
| 2,181,466 A | * | 11/1939 | Shackett | 52/660 |
| 2,787,570 A | * | 4/1957 | Lott et al. | 442/38 |
| 3,169,899 A | * | 2/1965 | Steuber | 428/198 |
| 3,222,237 A | * | 12/1965 | McKelvy | 156/177 |
| 3,232,017 A | * | 2/1966 | Prusinski et al. | 52/309.9 |
| 3,302,362 A | * | 2/1967 | Lang | 52/742.13 |
| 3,303,019 A | * | 2/1967 | Jacobs | 75/679 |
| 3,411,256 A | * | 11/1968 | Best | 52/408 |
| 3,712,845 A | * | 1/1973 | Hartung | 8/48 |
| 3,770,559 A | * | 11/1973 | Jackson | 428/40.3 |
| 4,016,323 A | * | 4/1977 | Volovsek | 442/374 |
| 4,021,981 A | * | 5/1977 | Van Wagoner | 52/309.13 |
| 4,113,907 A | * | 9/1978 | Haage et al. | 428/111 |
| 4,130,614 A | * | 12/1978 | Saidla | 264/46.4 |
| 4,160,346 A | * | 7/1979 | Kaufmann | 52/96 |
| 4,170,675 A | * | 10/1979 | Greengrass | 428/109 |
| 4,299,872 A | * | 11/1981 | Miguel et al. | 428/117 |
| 4,343,847 A | * | 8/1982 | Meynard | 428/139 |
| 4,617,221 A | * | 10/1986 | von der Chys | 428/139 |

(Continued)

FOREIGN PATENT DOCUMENTS

DE 2225358 12/1972

(Continued)

*Primary Examiner* — Phi Dieu Tran A
(74) *Attorney, Agent, or Firm* — Nixon & Vanderhye P.C.

(57) ABSTRACT

Plate-shaped cover material comprising an elastomeric layer and a plastically deformable metal mesh or metal plate, the elastomeric layer consisting of a glue or joint sealant cured to an elastomer and having strong adhesion to the metal mesh or the metal plate.

41 Claims, 2 Drawing Sheets

U.S. PATENT DOCUMENTS

| | | | |
|---|---|---|---|
| 4,686,806 A * | 8/1987 | Bennett | 52/309.4 |
| 4,706,432 A * | 11/1987 | Fishburn | 52/407.1 |
| 4,722,754 A * | 2/1988 | Ghosh et al. | 75/236 |
| 4,722,771 A * | 2/1988 | Textor et al. | 205/201 |
| 4,739,603 A * | 4/1988 | Butler | 52/750 |
| 4,789,578 A * | 12/1988 | Twyford et al. | 428/40.3 |
| 4,803,111 A * | 2/1989 | Mansell | 428/139 |
| 4,882,888 A * | 11/1989 | Moore | 52/309.9 |
| 4,944,818 A * | 7/1990 | Dybsky et al. | 156/71 |
| 5,129,628 A * | 7/1992 | Vesper | 256/31 |
| 5,137,764 A * | 8/1992 | Doyle et al. | 428/44 |
| 5,229,185 A * | 7/1993 | Shiota et al. | 428/138 |
| 5,310,592 A * | 5/1994 | Baker et al. | 428/117 |
| 5,382,445 A * | 1/1995 | Yasis | 427/2.31 |
| 5,414,964 A | 5/1995 | Bodycomb | |
| 5,714,257 A | 2/1998 | Shah et al. | |
| 6,087,467 A * | 7/2000 | Marrocco et al. | 528/125 |
| 6,194,051 B1 * | 2/2001 | Gagas et al. | 428/99 |
| 6,858,461 B2 * | 2/2005 | Oswald et al. | 438/68 |

FOREIGN PATENT DOCUMENTS

| | | | | |
|---|---|---|---|---|
| DE | 3310989 | | 10/1984 | |
| DE | 3419624 | | 11/1985 | |
| DE | 3642063 | | 7/1987 | |
| EP | 0123141 | | 10/1984 | |
| EP | 0924363 | | 6/1999 | |
| GB | 2051910 | * | 1/1981 | 52/410 |
| GB | 2184685 | | 7/1987 | |
| GB | 2218436 | * | 11/1989 | 52/410 |
| WO | WO 9531620 | | 11/1995 | |
| WO | WO 9606245 | | 2/1996 | |

* cited by examiner

PLATE-SHAPED COVER MATERIAL

CROSS-REFERENCES TO RELATED APPLICATIONS

This application is the U.S. national phase of International Application No. PCT/DK01/00597 filed on Sep. 13, 2001, which designates the U.S. and claims priority to DK PA200100167, filed Feb. 1, 2001 and DK PA200001359, filed Sep. 13, 2000, the entire contents of each of which are hereby incorporated by reference.

TECHNICAL FIELD

The invention relates to a plate-shaped cover material comprising an elastomeric layer and a plastically deformable metal mesh or metal plate. Such cover materials are particularly used for flashing roof lead-ins, such as chimneys, skylights, air ducts, attics and the like. The cover material is further suitable for preformed, plastically deformable flashing sections and the like building members.

BACKGROUND ART

DE 3642063 discloses a cover material according to the preamble of claim 1, and wherein the elastomeric layer is formed of a non-tacky polyisobutylene substrate (PIB). The cover material is provided with an adhesive layer for being sealed to a base, eg a roof, in connection with a roof lead-in. Wax is added so as to protect the polyisobutylene substrate against ozone. At high temperatures, eg on a hot summer's day, the wax may escape from the polyisobutylene substrate and thus ruin the bonding to the base, whereby the material may slide. Furthermore, the surface is not suitable for being painted over.

DE 3310989 disclosed a plastically deformable cover material comprising an elastomeric layer and a plastically deformable metal mesh. The elastomer material is made from a rubber material, preferably vulcanizable EPDM rubber (ethylene-propylene rubber). Various reinforcing fillers and vulcanizing accelerators are often added to this polymer material to obtain sufficiently strong mechanical properties. These additives hamper the adhesiveness of the material such that long-term adhesion is difficult to obtain.

DE 2225358 discloses a plastically deformable cover material comprising an elastomeric layer and a plastically deformable metal mesh, the elastomeric layer comprising a non-adhesive bitumen-rubber compound on one side and a self-adhesive bitumen-rubber layer on the other side. A drawback of this cover material is that suitable bitumen compositions have a softening point of between 70° C. and 175° C. resulting in limited low-temperature formability thereof. Furthermore bitumen-based materials are not suitable for bonding by means of conventional glues and joint sealants.

EPO 0 924 363 discloses the use of inter alia polyurethane in cover materials of the above type.

U.S. Pat. No. 5,414,964 discloses a cover material in which EPDM-rubber is used as elastomer.

BRIEF DESCRIPTIONS OF THE INVENTION

The object of the invention is to provide a new and improved cover material of the above type, said material being particularly improved as regards deformability, density, adhesiveness and strength.

According to the invention the object is obtained in that the elastomeric layer is formed of a glue or a joint sealant to which adhesion promoters have been added, said glue or joint sealant being cured to an elastomer and having strong adhesion to the metal mesh or metal plate in its cured stated. Glues, sealing compounds or joint sealants are usually used for bonding materials and/or for filling joints in structures in order to absorb dimensional changes due to for instance temperature variations or contractions of volume. The adhesion of these sealants to the materials with which they bond is typically equal to the cohesive forces of the sealant. If the cohesive forces of the glue, joint sealant or adhesive equal the cohesive forces of the bonded materials, a new break due to excess load typically takes place outside of the glue joint. By using such an adhesive for manufacturing the elastomeric layer of the plate-shaped cover material a very strong material is obtained. Even though the cover material is heavily deformed during and after mounting, the material retains its density as a result of the strong adherence of the elastomer to the metal plate or the metal mesh. Often it is unnecessary to pre-treat the metal mesh or the metal plate with a primer to obtain strong and effective adhesion. Another advantage is that the same type of glue or joint sealant as the one from which the elastomer is made may be used for adhering the cover material to the base. A particularly strong and secure adhesion is thus ensured.

Such glue and joint sealants may typically be based on a MS polymer, polyurethane or silicone.

MS polymers are materials primarily used for glueing and joint sealing and not as basis material in a moulding material. The material is made by a silane modification of a polymer resulting in a polymer composition able to adhere to most surface types and curing to an elastomer when subjected to moisture.

U.S. Pat. No. 5,714,257 discloses the use of MS polymers in the production of extruded, non-woven fibre webs for various applications and mentions suitable silanes and polymers for this purpose.

Sealing compounds, joint sealants and the like based on MS polymers are sold under brand names like for instance Casco building joint sealant S40 containing 1-5% of vinyltrimethoxysilane, 10-30% of MS polymer and 30-60% of calcium carbonate. The MS polymer may for instance be polyoxypropylene. Previously, 10-30% of diisodecyl phthalate were added as plasticiser, but today this compound has been replaced by plasticising compounds without compulsory marking in Denmark.

Corresponding products from Simson Industry are sold under the brand name ISR 70-xx and contain 2.5% of alkoxysilane, 30-60% of polyether polymer (MS polymer) and 30-60% of calcium carbonate.

Henkel also sells MS polymer-based sealants and glue under such brands as Terostat MS 930. Dana Lim sells inter alia the brand MS 520.

According to the invention the glue or joint sealant may be based on an MS polymer. This material has an excellent adhesiveness and a particularly strong adhesion to the metal mesh or the metal plate, and may be obtained by means of a curing process. It is also easy to seal the cover material to various types of bases during mounting thereof by means of a MS adhesive or other joint sealants, common joint sealants adhering strongly to cured MS polymers, said MS polymers also being paint-compatible. Moreover MS polymers are highly elastic over a large temperature span, thus allowing deformation of the cover material without causing cracking and consequent leaks. Finally MS polymers are work-environmentally sound materials. Casco MS 20 is typically used for indoor joints in buildings and has the OAR (occupational air requirement) code 001, confer the Danish Working Environment Service's Administrative Orders about establishment of and work with code numbers, Orders No 301 and 302 of May 13, 1993.

According to the invention the elastomeric layer may comprise 0.01-10% by weight of silane, 10-60% by weight of MS polymer and 30-60% by weight of calcium carbonate. This material has proved particularly suitable.

The glue or joint sealant may according to the invention be based on a silane-modified polyurethane.

According to the invention the glue or joint sealant may be based on a hybrid non-isocyanate polyurethane (HNIPU). This material is advantageous in that the use of isocyanate is avoided, said substance being environmentally unsound.

The glue or joint sealant may finally be based on silicone. Silicone is advantageous in that it can tolerate very high temperatures, viz, to a high of 300° C.

According to the invention the cover material may comprise a reinforcement layer of a permeable material pretreated for sealing, eg. a non-woven felt layer of polypropylene. An increased strength is thus obtained, the reinforcement layer limiting the plastic deformation and thus minimizes the risk of cracking and consequent leaks. Due to permeability of the reinforcement layer, the cohesive force of the elastomeric layer is not greatly reduced.

According to the invention the reinforcement layer may be arranged at the lower side of the cover material. As a result the moulding of the cover material is facilitated in that the finished cover material may be removed from the mould due to a slight porosity on the lower side resulting from the reinforcement layer. This porosity has surprisingly proved to provide an increased adhesion to the base, the adhesive penetrating into the pores.

According to an embodiment the metal mesh may be formed of an expanded metal grid, whereby a high plastic deformability is ensured.

In order to increase the plastic deformability the expanded metal grid is made from aluminium.

The expanded metal grid may be recrystallized by a suitable heat treatment so as to reduce the deformation tensions arising at the manufacture of the expanded metal grid, whereby the expanded metal grid is more readily deformed.

According to an embodiment in order to enhance the rigidity, the plate-shaped cover material may in places be provided with additional reinforcement layers, metal meshes or metal plates optionally being perforated. An increased rigidity in desired places and an increased deformability in desired places are thus obtained.

According to the invention the upper face of the cover material may be coated with an UV-impenetrable material, eg in form of a coating material comprising slate so as to obtain an excellent and effective ultraviolet light protection of the cover material as well as an aesthetic appearance.

According to the invention the cover material may be shaped as a strip being provided with a self-adhesive tape on one side along one rim. This embodiment is particularly advantageous in that the self-adhesive tape may ensure sealing of the cover material to a base during mounting prior to the final bonding by means of a suitable adhesive. This is particularly advantageous when flashing for instance a round or square lead-in, eg a chimney led through a slanting roof, the self-adhesive tape retaining the strip, while this is being deformed to close abutment with the chimney and the roof, respectively. By means of this strip extremely strong transitions between roof lead-ins and roofs or cover materials are obtained, said transitions relieving the load on the cover material and rendering the use of cover strips, eg of metal, superfluous. The strip may optionally be bent about 90° to form a flashing section.

An adhesion promoter based on silanes or amines may be added to the glue or joint sealant according to the invention.

The invention also relates to a method for the manufacture of a cover material according to one of the preceding claims and in which a permeable reinforcement layer of for instance non-woven polypropylene felt optionally is placed in the bottom of a mould, the glue or joint sealant is spread in the mould by means of a filling process, injection process or by another process, whereafter the deformable metal mesh is pressed down into the glue or joint sealant and any optional reinforcement layers are arranged, and in which ground slate optionally is scattered on top of the glue or joint sealant, before the latter cures, whereafter the cover material is removed from the mould.

Heat or moisture may be added so as to accelerate the curing process.

A vapour-permeable material with low surface tension may optionally be placed in the bottom of the mould. With a view to an accelerated curing process, vapour may be added to the glue or joint sealant. Similarly the plate material may be removed from the mould by means of a permeable material layer, before complete curing of the glue or joint sealant for better utilization of the mould. PE (polyethylene) and PP (polypropylene) are both suitable for this purpose due to the low surface tension thereof, whereby the permeable layer may be removed easily from the fully cured glue or joint sealant. A particular suitable material has proved to be TYVEK® marketed by DuPont. The TYVEK® layer may remain on the finished product, as it possesses excellent anti-drip properties. If the TYVEK® layer (or another layer with similar properties) remains in an area sealing the gap between the roof and the lead-in, the draw-back of condensed water dripping into the gap is reduced.

BRIEF DESCRIPTION OF THE DRAWINGS

The invention is described in greater detail below with reference to the accompanying drawing, in which.

BEST MODES FOR CARRYING OUT THE INVENTION

Figure 1:
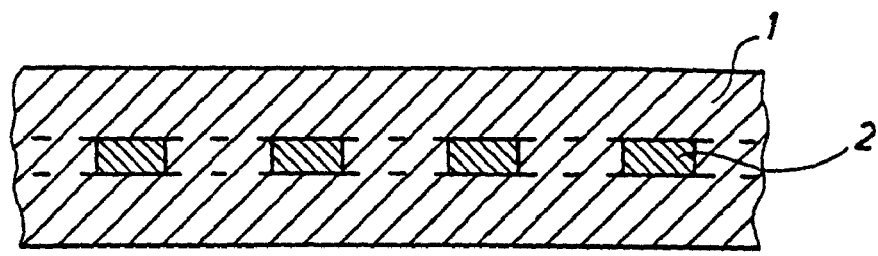
FIG. 1 is a diagrammatic sectional view through a first embodiment of the cover material according to the invention.

The embodiment shown in FIG. 1 simply consists of an expanded metal grid 2 of aluminium and an elastomeric layer 1 comprising MS polymer. By means of a suitable heat treatment at about 300° C. the expanded metal grid 2 has been recrystallized to obtain a high plastic deformability. The MS polymer of the elastomer may be any MS polymer possessing the desired properties. Casco Bygfuge S20 containing 1-5% of vinyltrimethoxysilane, 10-30% of polyoxypropylene (MS polymer) and 30-60% of calcium carbonate is used in the embodiment shown. In its cured state this compound has a Shore A hardness of 20-30. The aluminium expanded metal grid has a mesh size of 10×5 mm, a rib width of 1.5 mm and a rib thickness of 0.9 mm. The thickness of the cover material per se, ie of the elastomeric layer, is about 3 mm.

Figure 2:
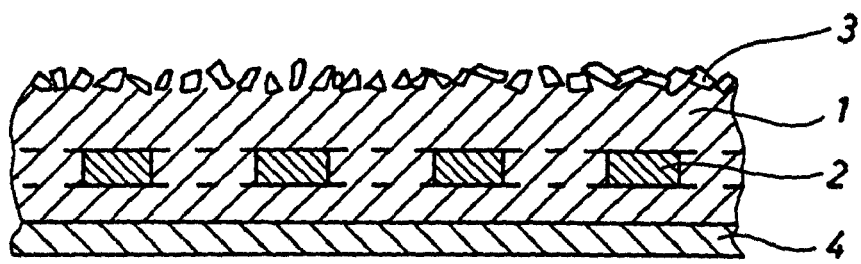
FIG. 2 is a diagrammatic sectional view through a second embodiment of the cover material according to the invention.

The embodiment of the cover material according to the invention shown in FIG. 2 is provided with a UV-protecting layer 3 of ground slate. The slate has paint compatibility. The upper face 3 may optionally be provided with a layer of sand, fine shingles or copper foil. The lower face is provided with a reinforcement layer 4 in form of a non-woven polypropylene felt sold under the brand name "Plantex fixrulle" (trade mark registered by DuPont) with the type designation 3207. This material is UV-stabilised and sold as a so-called geotextile, which inter alia is used to distribute loads under gravel and tiles. The reinforcement layer has a thickness of about 0.3 mm and increases the strength of the cover material and prevents cracking and the like in the elastomeric layer caused by excessive plastic deformation. In order to enhance the adhesion of the reinforcement layer to the MS polymer, the surface thereof is corona-treated prior to the embedment process. However it should be noted that the cover material may be formed around very sharp corners in several directions without being damaged. The pores of the reinforcement layer is filled up by the elastomer during moulding of the cover material, whereby the surface of the elastomer ensures a subsequent strong adhesion to a base. The lower face is, however, semi-porous, which has proved to provide a particular strong adhesion to a base when MS polymer is also used for sealing.

Figure 3:
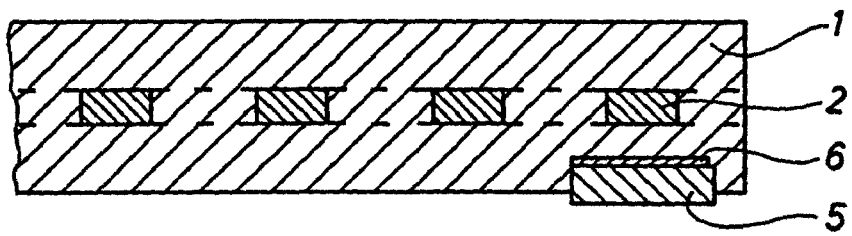
FIG. 3 is a diagrammatic sectional view through a third embodiment of the cover material according to the invention.

The embodiment shown in FIG. 3 differs from the one shown in FIG. 1 in that a self-adhesive tape 5 is embedded in the lower face by means of which the cover material may be sealed during the mounting per se, the mounting process thus being facilitated. The tape used in this case is a so-called VHB-tape based on a viscoelastic acrylic adhesive. A metal foil strip 6 is provided between the tape and the elastomer to prevent mixing of the non-cured MS polymer and the acrylic adhesive during moulding of the cover material.

Figure 7:
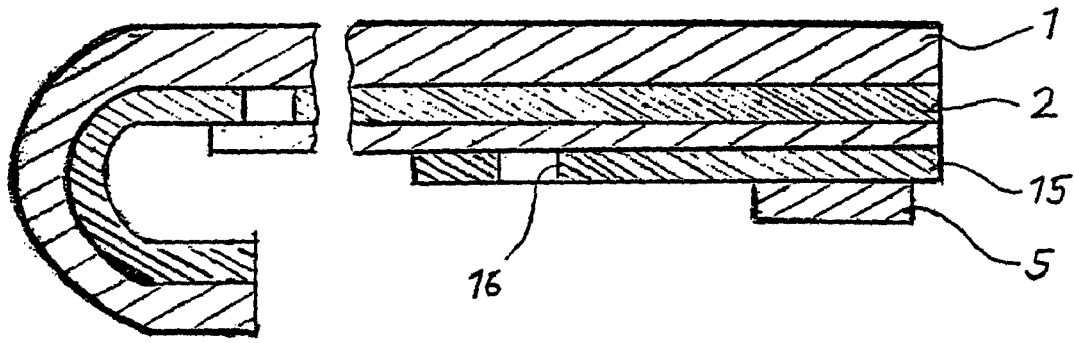
FIG. 7 is a diagrammatic sectional view through a fourth embodiment of the cover material according to the invention.

FIG. 7 illustrates an embodiment, in which a metal plate 2 is used instead of a metal mesh. Areas of the lower face thereof are provided with an additional metal plate 15. The additional metal plate 15 is typically arranged adjacent the edge of a strip-shaped cover material, which is to abut a roof lead-in, whereby increased rigidity is obtained in this area. The additional metal plate 15 may be made from recrystallised aluminium. As can be seen in FIG. 7, the VHB-tape is fixed to the lower face of the additional metal plate 15.

Common dual adhesives, typically with acrylic base, are also applicable in that they only have to keep the assembly in place, until the MS polymer used for the mounting has cured. The shown additional plate 15 is provided with perforations 16 to weaken the rigidity adjacent the area, which is not provided with an additional metal plate 15. As a result "softer" transition is obtained. The additional plate 15 may otherwise be provided with perforations 16 to provide the desired rigidity.

The metal plate 2 may also be provided with perforations to provide a desired rigidity. The size or closeness of these perforations may vary depending on the position on the plate so as to provide varying rigidity depending on the position. It is thus possible to provide a high degree of rigidity in the area close to a roof lead-in and a high degree of deformability in the area distanced therefrom.

In FIG. 7 the thickness of both the metal plate 6 and the additional metal plate 15 is about 0.5 mm.

In FIG. 7 one of the side rims are folded down 180° to increase the rigidity so as to minimise the risk of the wind lifting the cover material and/or causing it to vibrate resulting in noise and possible destruction of the flashing.

The MS polymer has proved particularly suitable for this purpose due to its strong adhesion to the reinforcement layer 4, the expanded metal grid or the metal plate 2 and the ground slate 3. A particularly strong adhesion is further obtained when the same material is used as adhesive/joint sealant for sealing the cover material to the base. This is most likely due to a "recasting" of the lower face of the cover material taking place when this is comes into contact with a non-cured MS polymer.

Figure 4:
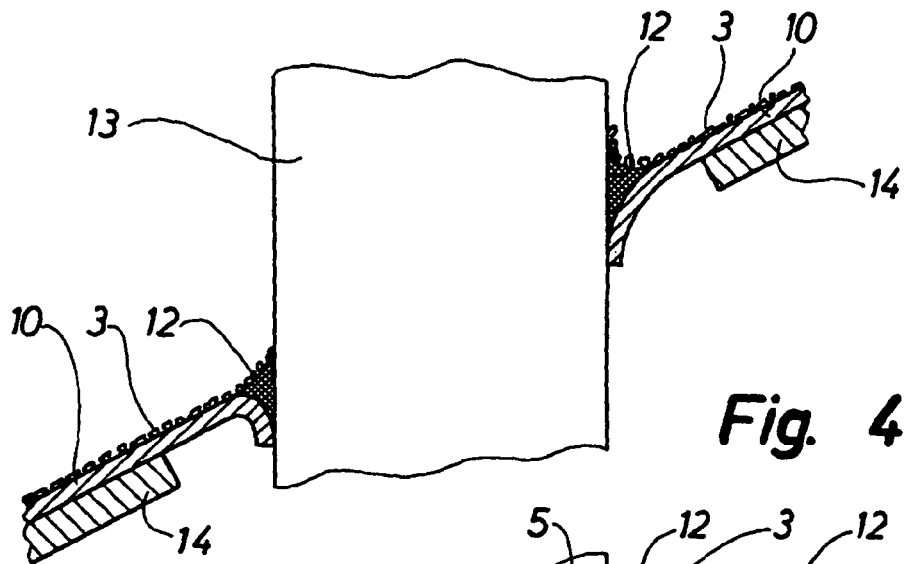
FIG. 4 is a sectional view through a roof lead-in, the cover material according to the invention being used as flashing material.
Figure 5:
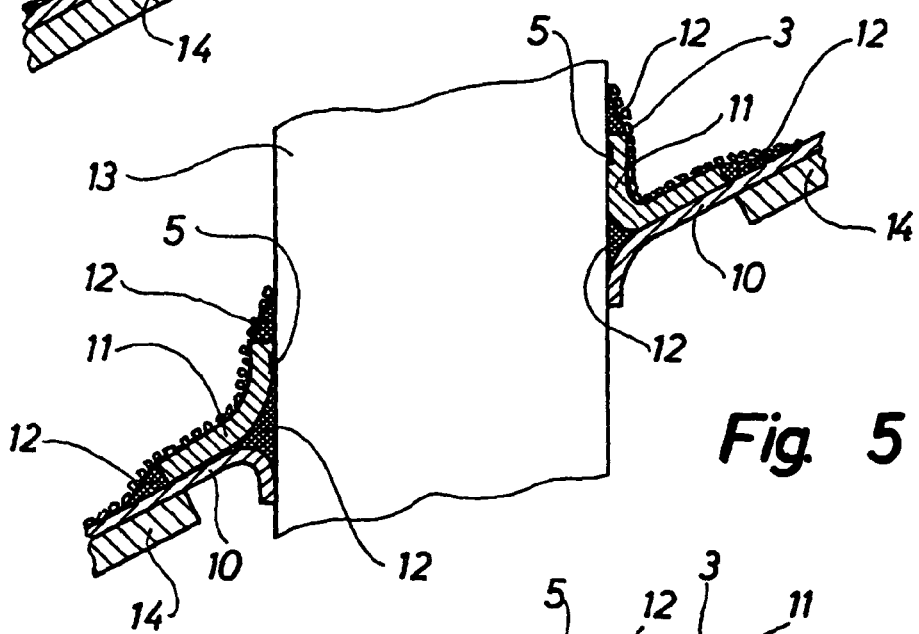
FIG. 5 is a sectional view through a roof lead-in, the cover material according to the invention being used as flashing material in another manner.
Figure 6:
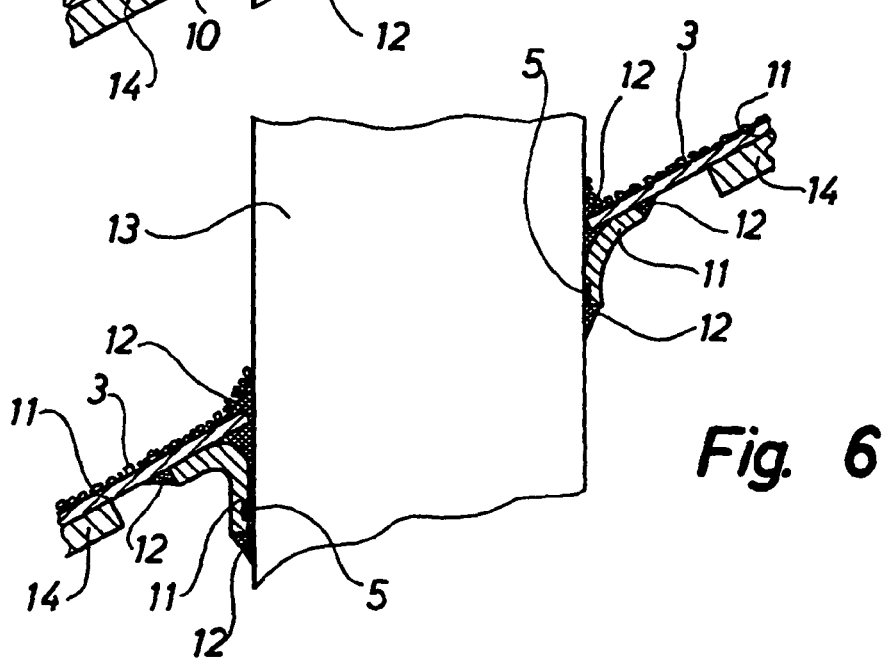
FIG. 6 is a sectional view through a roof lead-in, the cover material according to the invention being used as flashing material in a third manner.

FIGS. 4, 5 and 6 illustrate how the cover material in various embodiments may be used for flashing a roof lead-in in form of a cylindrical metal member 13 through a slanting roof 14. The cover material shown in FIGS. 4-6 comprises an expanded metal grid as shown in FIGS. 1-3, the latter, however, being omitted for reasons of clarity. FIG. 4 illustrates a simple embodiment, in which the cover material 10, which may be of the embodiment shown in FIG. 2, is folded and sealed to the metal cylinder 13 by means of a MS polymer joint sealant 12. Preferably a MS polymer is also used for adhering the lower face of the cover material 10 to the roof 14. As can be seen, ground slate has been scattered on top of the joint sealant immediately subsequent to the application thereof.

FIG. 5 illustrates a mounting, in which the cover material 10 is folded along the metal cylinder 13 as seen in FIG. 4, but where an additional and particularly strong sealing has been made by means of a cover material strip 11 with embedded tape 5 as seen in FIG. 3. The cover material may for instance be provided with expanded aluminium grid layers 2 and a felt layer arranged therebetween. During mounting the strip 11 is sealed to the metal cylinder by means of the tape 5 and retained in this position, while being made to abut the cover material 10 and sealed thereto by means of the MS polymer joint sealant 12. FIG. 6 illustrates a mounting corresponding to that shown in FIG. 5, except that the strips 11 are sealed to the lower face of the cover material 11 and that the cover material 11 is sealed to the metal cylinder 13 by means of a MS polymer joint sealant 12. In all cases ground slate may be cut off or ground off the portion of the surface of the plate material 10 to be sealed to the lead-in (FIG. 4) or the strip 11 (FIG. 5). A MS polymer is typically applied to surfaces to be bonded, outflowing paste and any additionally provided MS polymer paste being smoothed out to a slanting smooth transition as shown at all the transitions and trims.

In FIGS. 4, 5 and 6 the strip 11 is arranged about a circular lead-in 13. Due to its flexibility the strip 11 may also readily be mounted integrally about a square lead-in. Despite the bending at 90° the strip 11 retains an angular shape as shown in FIGS. 4, 5 and 6.

Since the cover material 10 or the cover material strip 11 adheres easily and thus enables a particularly strong adhesion to many different surfaces, so-called splats can often be omitted. In connection with less sturdy surfaces, where adhesion is insufficient, the strip 11 may be used as a ductile splat being mechanically secured by means of screws, rivets, nails or by being grouted in between two rows of bricks. For bedding purposes the strip may advantageously be provided with slate on both sides to obtain a strong bond to the mortar.

The MS polymer forming part of the moulding compound for the elastomeric layer, may have many different compositions. The polymer may be a polyolefin, eg a styrenic block copolymer, polyester, polyester, polyamide, polyurethane, ethylene vinyl acetate and the like compounds. The silanes for modifying the said polymers may be amino silanes, epoxy silanes, ureido silanes, vinyl silanes or the like. In addition to the MS polymer calcium carbonate may be added to the moulding compound as filler.

The invention is not restricted to the above embodiments. The metal mesh may for instance be a mesh or a grid of for instance steel or zinc. Especially zinc alloys are advantageous in that they can be manufactured cost-effectively and are easily deformed.

As the top layer for UV protection—and for obtaining an aesthetic appearance—sand or paint may be used in addition to or in replacement of ground slate.

As noted above an optionally perforated metal plate of recrystallized aluminium or zinc may be used instead of a metal mesh. Such an embodiment is typically suitable for applications with lower deformability requirements.

Irrespective of a metal mesh or a metal plate is used as the embedded part, this part may be made from conventional aluminium which is easily deformed. Conventional aluminium corrodes very easily in certain environments, but in this case it is encapsulated by a MS polymer and thus corrosion-proof.

The embodiment shown in FIGS. 1-3 is more rigid than the conventionally used 1 mm lead plate, as about twice the force is required for bending it. In return the cover material is considerably stronger than a lead plate after mounting due to strain hardening. In other respects the cover material according to the invention has many of the advantages which have made lead plates popular.

In the embodiment shown a MS polymer is used for the elastomer. According to the invention the glue or joint sealant used may also be based on polyurethane or silicone. Especially so-called hybrid non-isocyanate polyurethane/HNIPU is advantageous, the health and environmental risks associated with isocyanate during the manufacture and use of conventional polyurethane (PUR) being avoided. Silane-modified polyurethane is also suitable for this purpose due to its particularly strong sealing properties, ie. adhesion.

Joint sealants based on the various described materials typically have the following elongations at break: MS polymer 300-700%, PUR 200-600% and silicone 100-300%.

The plate-shaped cover material according to the invention is typically produced in webs having a width of up to 1-2 metres. These webs may then be wound up into coils. The cover material may be made by moulding in moulds or by extrusion.

The invention claimed is:

1. A plate-shaped roof cover material comprising an elastomer and an expanded metal grid, wherein the elastomer includes a glue or a joint sealant, the glue or joint sealant being highly elastic over a wide temperature range and providing strong adhesion to the metal grid, the metal grid having a plurality of ribs with openings, each opening being defined by its surrounding ribs, the openings being dimensioned such that the elastomer is embedded within the openings and between adjacent ribs, and the metal grid is a plastically deformable recrystallized expanded grid of aluminum or zinc, the elastomer and the embedded deformable metal grid allowing the roof cover material to be readily plastically deformed and, as a result of deformation and its material make-up, the metal grid is strain-hardened in use.

2. A plate-shaped roof cover material according to claim 1, wherein the glue or joint sealant is based on a MS (modified silane) polymer, polyurethane or silicone.

3. A plate-shaped roof cover material according to claim 2, wherein the glue or joint sealant is based on a MS (modified silane) polymer and comprises 0.01-10% by weight of silane, 10-60% by weight of MS polymer and 30-60% by weight of calcium carbonate, and wherein the total of said weight percentages is equal to or less than 100%.

4. A plate-shaped roof cover material according to claim 2, wherein the glue or joint sealant is based on silane-modified polyurethane.

5. A plate-shaped roof cover material according to claim 2, wherein the glue or joint sealant is based on hybrid non-isocyanate polyurethane (HNIPU).

6. A plate-shaped roof cover material according to claim 2, wherein the glue or joint sealant is based on silicone.

7. A plate-shaped roof cover material according to claim 1, further comprising one or more reinforcement layers of a permeable material.

8. A plate-shaped roof cover material according to claim 7, wherein at least one of the reinforcement layers is a non-woven felt layer of polypropylene.

9. A plate-shaped roof cover material according to claim 7, wherein the cover material has a lower face and at least one of the reinforcement layers is arranged at the lower face of the elastomer.

10. A plate-shaped roof cover material according to claim 1, wherein selected areas of the plate-shaped roof cover material are provided with a reinforcement layer, or an additional metal mesh or metal plate to increase rigidity.

11. A plate-shaped roof cover material according to claim 1, wherein a surface of the cover material is coated with an upper layer of an UV-impenetrable material.

12. A plate-shaped roof cover material according to claim 1, wherein said material is shaped as a strip being provided with a self-adhesive tape provided to a lower face of the elastomeric layer.

13. A plate-shaped roof cover material according to claim 1, wherein an adhesion promoter is added to the glue or joint sealant.

14. A method for the manufacture of a plate-shaped roof cover material according to claim 1, comprising placing the glue or joint sealant in a mold, pressing the plastically deformable recrystallized metal grid and the elastomer against one another, and removing the roof cover material from the mold after the glue or joint sealant is cured.

15. A plate-shaped roof material according to claim 1 wherein the expanded grid is recrystallized by heat treatment.

16. A plate-shaped roof material according to claim 11 wherein the UV-impenetrable material is ground slate.

17. A plate-shaped roof material according to claim 13 wherein the adhesion promoter is based on silanes or amines.

18. A plate-shaped roof material according to claim 1, wherein the glue or joint sealant is paint-compatible.

19. A plate-shaped roof material according to claim 1, wherein the metal grid is plastically deformed to include a bend of up to 90° without spring back.

20. A plate-shaped roof material according to claim 1, wherein the metal grid is plastically deformed to include a bend of greater than 90° without spring back.

21. A plate-shaped roof material according to claim 1, wherein each rib has a generally rectangular cross-section in which the width is greater than the thickness.

22. A plate-shaped roof material according to claim 21, wherein a ratio of width to thickness is about 1.7.

23. A plate shaped roof material according to claim 22, wherein the width is about 1.5 mm and the thickness is about 0.9 mm.

24. A plate-shaped roof material according to claim 1, wherein the openings of the metal grid have a dimension of about 10 mm.

25. A plate-shaped roof material according to claim 24, wherein each opening has dimensions of about 10 mm by 5 mm.

26. A plate-shaped roof material according to claim 1, wherein a thickness of the elastomeric layer is about 3 mm.

27. A plate-shaped roof material according to claim 12, wherein the self-adhesive tape is embedded in the lower face of the elastomeric layer.

28. A plate-shaped roof material according to claim 27, further comprising a metal foil strip between the self-adhesive tape and the elastomeric layer.

29. A method for the manufacture of a plate-shaped roof cover material according to claim 16, further comprising placing a reinforcement layer in a bottom of the mold prior to placing the glue or joint sealant in the mold so that the reinforcement layer is adhered to a lower surface of the elastomeric layer.

30. A method for the manufacture of a plate-shaped roof cover material according to claim 14, further comprising applying heat treatment to a metal grid of at least 300° C. to form the plastically deformable recrystallized metal grid.

31. A method for the manufacture of a plate-shaped roof cover material according to claim 14, further comprising placing slate on top of the glue or joint sealant in the mold before the glue or joint sealant cures.

32. A method for the manufacture of a plate-shaped roof cover material according to claim 14, wherein pressing the plastically deformable recrystallized metal grid relative to the elastomeric layer causes the elastomeric layer to be disposed between adjacent ribs of the metal grid.

33. A method of forming a plate-shaped roof cover material comprising:
providing an elastomer and an expanded metal grid, wherein the elastomer includes a glue or a joint sealant, the glue or joint sealant being highly elastic over a wide temperature range and providing strong adhesion to the metal grid,
providing the metal grid with a plurality of ribs with openings, each opening being defined by its surrounding ribs, dimensioning the openings being such that the elastomer is embedded within the openings between adjacent ribs by pressing the metal grid and the elastomer against or relative to one another,
forming the metal grid of a plastically deformable recrystallized expanded grid of aluminum or zinc, the elastomer and the embedded deformable metal grid allowing the roof cover material to be readily plastically deformed, and
strain-hardening the metal grid as a result of the plastic deformation and its material make-up.

34. A method of forming a plate-shaped roof cover material according to claim 33, further comprising forming a reinforcement layer is arranged at a lower face of the elastomeric layer.

35. A method of forming a plate-shaped roof cover material according to claim 34, wherein the reinforcement layer is a non-woven felt layer of polypropylene.

36. A method of forming a plate-shaped roof cover material according to claim 33, further comprising embedding a self-adhesive tape in a lower face of the elastomer.

37. A method of forming a plate-shaped roof cover material according to claim 36, further comprising embedding a metal foil strip between the elastomer and the self-adhesive tape.

38. A method of forming a plate-shaped roof cover material according to claim 33, further comprising selecting the adhesive glue or joint sealant to be of a same type as an adhering glue or joint sealant for adhering the plate-shaped roof cover material to a roof.

39. A method of forming a plate-shaped roof cover material according to claim 33, further comprising selecting the adhesive glue or joint sealant to be a paint-compatible glue or joint sealant.

40. A method of forming a plate-shaped roof cover material according to claim 30, further comprising applying heat treatment to a metal grid at least 300° C. to form the plastically deformable recrystallized metal grid.

41. A method of forming a plate-shaped roof cover material according to claim 33, wherein the cover material is formed with an extrusion process.

* * * * *